US 6,671,448 B2

(12) United States Patent
Goto et al.

(10) Patent No.: US 6,671,448 B2
(45) Date of Patent: Dec. 30, 2003

(54) OPTICAL WAVEGUIDE MODULE-MOUNTED PACKAGE

(75) Inventors: Masanori Goto, Tokyo (JP); Tohru Kineri, Tokyo (JP)

(73) Assignee: TDK Corporation, Tokyo (JP)

( * ) Notice: Subject to any disclaimer, the term of this patent is extended or adjusted under 35 U.S.C. 154(b) by 13 days.

(21) Appl. No.: 10/104,594

(22) Filed: Mar. 22, 2002

(65) Prior Publication Data

US 2002/0150373 A1 Oct. 17, 2002

(30) Foreign Application Priority Data

Mar. 27, 2001 (JP) ........................ 2001-089644

(51) Int. Cl.[7] .............................. G02B 6/00; G02B 6/255
(52) U.S. Cl. .......................................... 385/135; 385/99
(58) Field of Search ............................. 385/135, 136, 385/99, 14, 42, 88

(56) References Cited

U.S. PATENT DOCUMENTS

| 4,647,766 | A |   | 3/1987  | Dimur et al. ............ 250/227 |
|-----------|---|---|---------|----------------------------------|
| 5,005,942 | A | * | 4/1991  | Barlow et al. ........... 385/135 |
| 5,825,963 | A | * | 10/1998 | Burgett .................. 385/135 |
| 5,984,532 | A | * | 11/1999 | Tamaki et al. ............ 385/70  |
| 6,250,819 | B1| * | 6/2001  | Porte et al. .............. 385/88  |
| 6,443,633 | B1| * | 9/2002  | Liberty et al. ............. 385/99 |

FOREIGN PATENT DOCUMENTS

| DE | 4311979 A  | * | 10/1994 |              |
|----|------------|---|---------|--------------|
| JP | 3070028    |   | 5/2000  | .... 6/42    |

OTHER PUBLICATIONS

Patent Abstracts of Japan; vol. 1996, No. 08; Aug. 30, 1996 & JP 08 094876 A (Kyocera Corp.), Apr. 12, 1996.
Patent Abstracts of Japan; vol. 010, No. 260 (P–494); Sep. 5, 1986 & JP 61 086705 A (Matsushita Electric Ind. Co. Ltd.), May 2, 1986.
Patent Abstracts of Japan; vol. 1996, No. 11; Nov. 29, 1996 & JP 08 190029 A (Furukawa Electric Co. Ltd.; Nippon Telegr.& Amp; Telegraph Corp. & LT; NTT&), Jul. 23, 1996.

* cited by examiner

*Primary Examiner*—Michael C. Zarroli
(74) *Attorney, Agent, or Firm*—Drinker Biddle & Reath LLP

(57) ABSTRACT

An optical waveguide module-mounted package that includes an optical waveguide module in a separation type case. The module includes an optical waveguide chip and a pair of optical fibers, connected to said optical waveguide chip in the manner that the optical axes of said fibers and the chip are aligned with each other. The separation type case is formed by combining two identical half cases. Each half case has a mating surface with one or more recess-protrusion pairs for fitting. The recess and the protrusion the respective protrusion and recess of the combining partner.

5 Claims, 4 Drawing Sheets

OPTICAL WAVEGUIDE MODULE-MOUNTED PACKAGE

APPLICATION FIELD IN INDUSTRY

The present invention relates to an optical waveguide module-mounted package which comprises a case and an optical waveguide module mounted in the case, the module being comprised of an optical waveguide chip and optical fibers connected to the chip. More particularly, the present invention relates to an optical waveguide module-mounted package used in the field of optical communication.

BACKGROUND OF THE INVENTION

Prior Art

The recent development of optical communication technology has demanded optical waveguide module-mounted packages, such as optical branching elements and optical multiplexers, with higher cost performance and higher reliability. In general, the conventional optical waveguide module-mounted package is composed of an optical waveguide chip and optical fibers for optical input/output, connected to the terminal end surfaces of the optical waveguide chip.

When the optical waveguide module is put in use in communication system, it is generally necessary to protect the module by a package to enhance the reliability. The package provides resistance to external mechanical impact, thereby improving long-term reliability. When an optical waveguide is connected to optical fibers, a UV-setting resin is generally used as an adhesive for connection. It is known that the long-term adhesive property of the UV-setting resin is deteriorated due to intrusion of moisture. Therefore, it is of importance that the connecting portion of the optical waveguide module is protected by a case or similar means so that the connecting portion is not exposed to moisture (see Japanese Patent No. 3,070,028).

FIG. 1 shows a longitudinal cross section of a conventional optical waveguide module-mounted package, which contains an optical waveguide module comprising optical fibers 1 and an optical waveguide chip 2, connected in such manner that their axes are aligned with each other and a cylindrical case 4 in which the module is fixed via element-fixing members 3. The optical fibers 1 are fixed with optical-fiber lead-in members 5. The optical fibers 1 and the optical waveguide chip 2 are enclosed by the cylindrical case 4 and the optical-fiber lead-in members 5.

FIG. 2 shows a cross section of another conventional optical waveguide module-mounted package. An optical waveguide module comprising optical fibers 1 and an optical waveguide chip 2, connected in such manner that their axes are aligned with each other, is fixed to a lower half case 6 (the case is formed of an upper half case and a lower half case) by resin 7. The optical fibers 1 are fixed in position with optical-fiber lead-in members 5, and the optical waveguide module-mounted package is sealed with the upper half case 8 of the upper-lower separation type case. The optical fiber 1 and the optical waveguide chip 2 are enclosed by the lower half case 6 and the upper half case 8 of the upper-lower separation type case, and the optical-fiber lead-in members 5.

Problems to be Solved by the Invention

However, the structure of the conventional optical waveguide module-mounted package as shown in FIG. 1 has problems in that, in order to fix the optical waveguide module comprised of the optical waveguide chip and the optical fibers connected to the chip to the inside of the cylindrical case, it is necessary to pass the optical waveguide module through the cylindrical case and the optical fibers through the optical-fiber lead-in members. In addition, for adhesion of the optical waveguide chip to the cylindrical case via element-fixing members, special jigs are required due to the cylindrical shape. Further, the fixing portion cannot be visually checked from above the case and thus the workability becomes poor, resulting in additional working processes.

On the other hand, since the conventional optical waveguide module-mounted package shown in FIG. 2 is in the form of a box comprising an upper half and a lower half, as compared with the conventional case shown in FIG. 1, this shape allows visual checking of the portion of fixing the optical waveguide module to the case from above, and the workability is improved, leading to less working steps. However, more parts are necessary in this package, resulting in higher cost and more assembling steps, and the resultant package becomes costly.

As shown above, the conventional optical waveguide module-mounted packages have problems in that more parts are required and thus the cost for materials becomes higher; and this larger number of parts in turn requires more working processes, resulting in costly package.

The object of the present invention is to solve the above-mentioned problems by providing an optical waveguide module-mounted package in which members are integrated for the purpose of reducing the cost for materials, and the multifunction is added for the purpose of reducing the number of parts, while assemblage is still easily conducted.

DETAILED EXPLANATION OF THE INVENTION

Specifically, the present invention provides an optical waveguide module-mounted package containing an optical waveguide module in a separation type case, said module comprising an optical waveguide chip and a pair of optical fibers connected to said optical waveguide chip in the manner that the optical axes of said chip and said fibers are aligned with each other, wherein said separation type case is formed by combining two identical half cases, each half case being provided with a mating surface having one or more recess-protrusion pairs for fitting, said recess and said protrusion being fitted respectively over the protrusion and in the recess of the other half case.

It is preferred that each of the half cases of the above-mentioned separation type case has an optical-fiber lead-in groove at each end for leading the above-mentioned optical fibers into the case and two or more optical-fiber fixing grooves located internally of the lead-in groove for fixing the optical fibers by resin.

It is preferred that the above-mentioned separation type case have a step between the optical-fiber fixing grove and the fiber lead-in grove, so that the cross section of the optical-fiber fixing groove becomes larger than that of the fiber lead-in groove. With this structure, even when the amount of resin for fixing the optical fibers is in excess, leaking of the resin into the optical-fiber lead-in groove can be prevented. It is more preferred that the receiving recess of the optical waveguide chip be more receded or deeper, as compared with the optical-fiber fixing groove.

It is preferred that the mating surfaces of the two half cases forming the above-mentioned separation type case be adhered using a sealant, for the purpose of providing protection against ambient factors, such as moisture.

It is more preferred that the space of the above-mentioned separation type case is filled with resin for the purpose of providing further protection against ambient factors.

PREFERRED EMBODIMENT OF THE INVENTION

Figure 1:
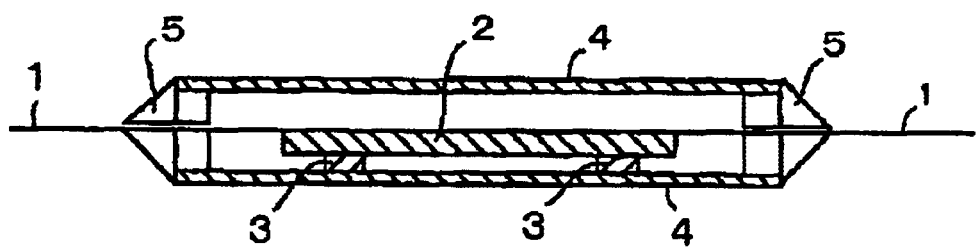
FIG. 1 shows a cross section of a cylindrical type optical waveguide module-mounted package.
Figure 2:
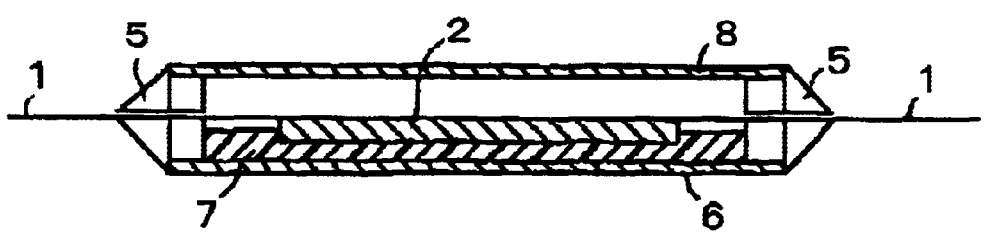
FIG. 2 shows a cross section of a upper-lower separation type optical waveguide module-mounted package.
Figure 3:
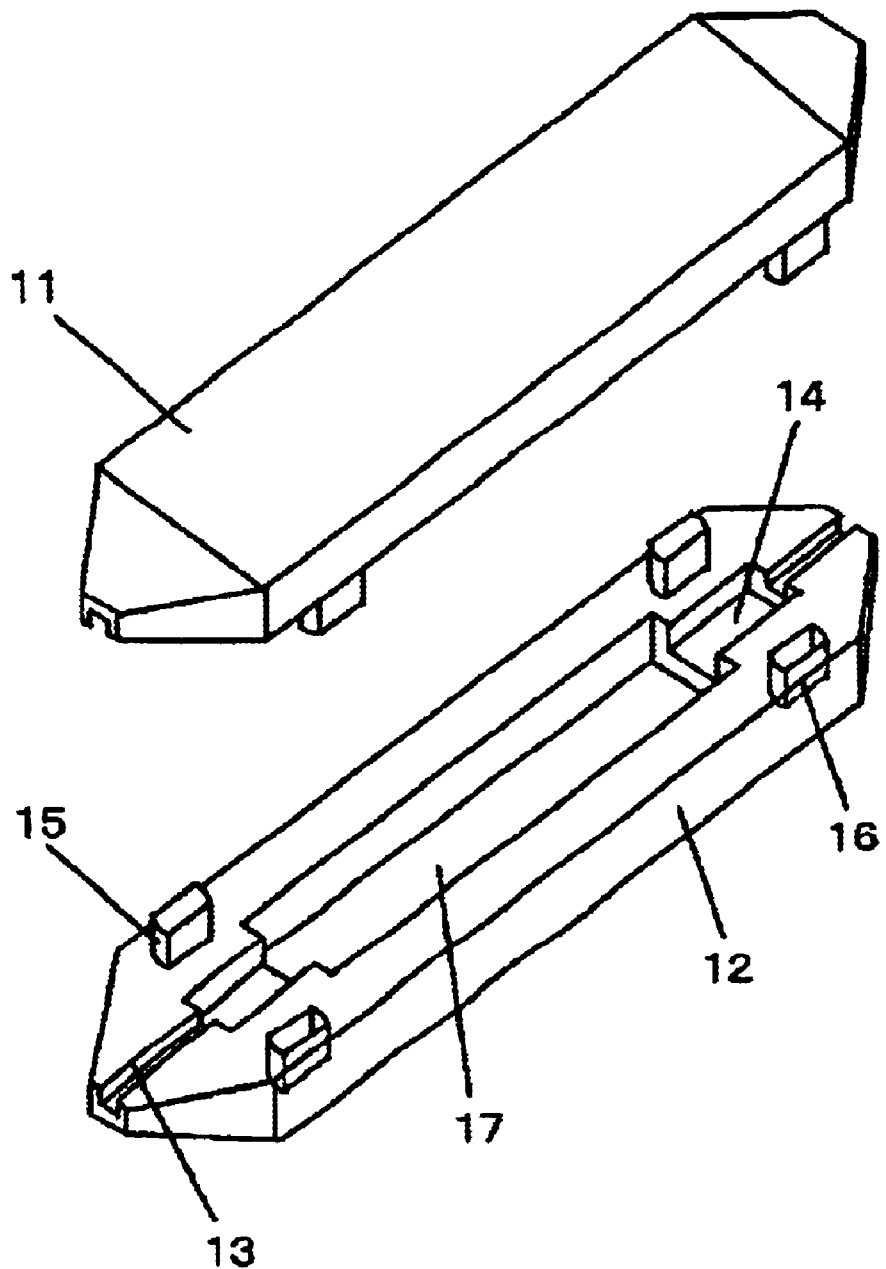
FIG. 3 shows a perspective of the upper-lower separation type case, each half case thereof having protrusions and recesses for fitting, according to one embodiment of the present invention.

FIG. 3 shows a perspective of one embodiment of the optical waveguide module-mounted package according to the present invention, representing a upper-lower separation type case composed of an upper half case and a lower half case provided with mating surfaces having protrusions and recesses for mutual fitting.

In each of the upper and lower half cases 11 and 12 of the upper-lower separation type case, a protrusion 15 and a recess 16 for fitting are located near each end (i.e. two pairs in total for each half case), which allows the fitting together of the upper half case 11 and the lower half case 12, both having the identical structure. The tolerance for the height, width and depth of the protrusion 15 are set to be minus, and the tolerance for the height, width and depth of the recess 16 is set to be plus, and therefore, even if manufacturing error is taken into account, the recess 16 always receives the protrusion 15 up to the base of the protrusion, so that the mating surfaces of the upper and lower half cases tightly contact or engage each other. When the material for the half cases 11 and 12 is resin, injection molding can be used for production, and when the material is metal, metal injection method can be used.

Figure 4:
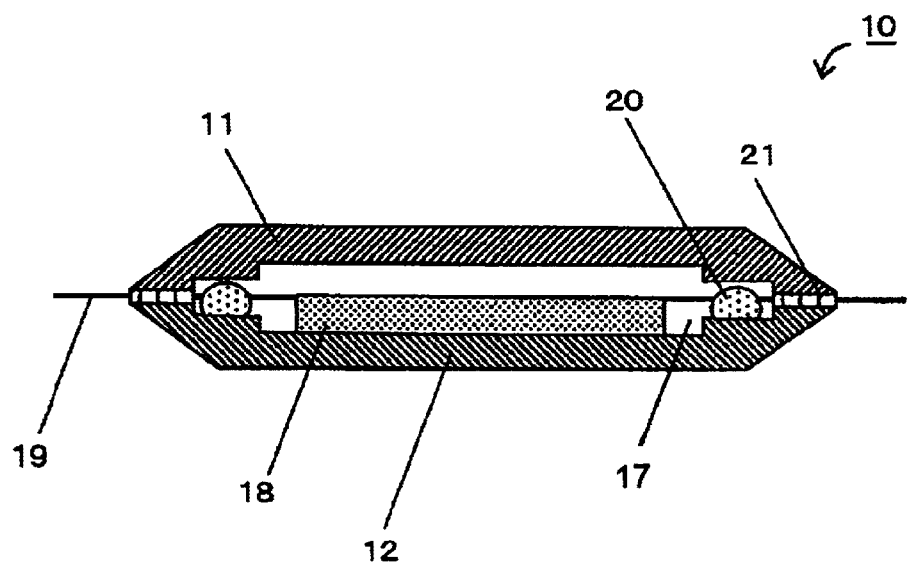
FIG. 4 shows a cross section of the optical waveguide module-mounted package according to one embodiment of the present invention.
Figure 5:
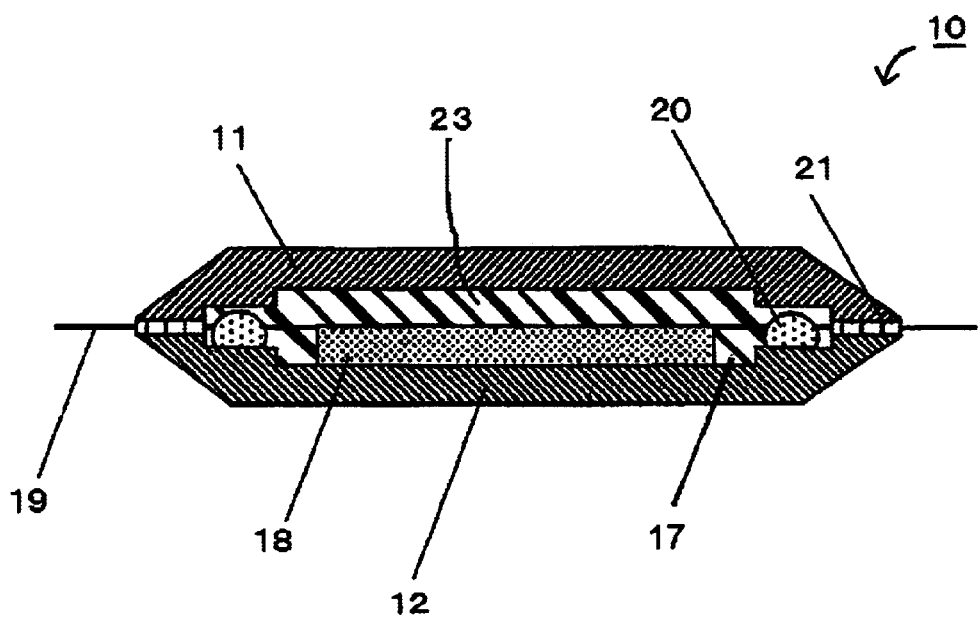
FIG. 5 shows a cross section of the optical waveguide module-mounted package filled with a resin.

FIG. 4 shows a cross section of an optical waveguide module-mounted package 10 according to one embodiment of the present invention. The optical waveguide module comprising an optical waveguide chip 18 and optical fibers 19 connected to the chip in such manner that their optical axes are aligned with each other, is contained in the upper-lower separation type case composed of the upper half and lower half cases 11 and 12 of which case are adhered via fitting of protrusions 15 and recesses 16. The optical fiber 19 is led in the space 17 of the case via the fiber lead-in groove 13.

At two locations in the upper-lower separation type case, the optical fibers 19 are fixed to the optical-fiber fixing groove (fixing portion) 14 using resin 20. It is desired that the resin have ability to absorb the difference in coefficients of linear expansion of the optical fibers 19, the optical waveguide chip 18 and the half cases 11 and 12 of the upper-lower separation type case; and that the resin secures the optical fibers 19 to the half cases 11 and 12 of the upper-lower separation type case. Examples of such resin include thermosetting silicon resin and flexible UV-setting resin. When more adhesion is required, the resin can be applied between the back surface of the optical waveguide chip and the corresponding portion of the case.

In the case, the inner bottom surface of the receiving recess 17, with which the back surface of the optical waveguide chip contacts, is receded most, in order to receive the thickness of the optical waveguide chip. The optical-fiber fixing groove 14 is stepwise receded from the level of the fiber lead-in groove 13, and the depth becomes shallower in this order. By providing this step between the optical-fiber fixing groove 14 and the fiber lead-in groove 13 in the depth direction, leaking of the resin used for fixing the optical fiber to the outside can be prevented, which may occur via the fiber lead-in groove. It is more preferred that another step be provided between the receiving recess 17 and the fixing groove 14 in the same manner.

The upper half case and the lower half case of the upper-lower separation type case are adhered to each other by means of a sealant 21 exhibiting excellent moisture-proof The sealant 21 prevents the inside of the case from exposing to moisture, and deterioration in the properties of the connection part between the optical waveguide 18 and the optical fibers 19 can be avoided. Then more moisture-proof is required, the space inside the case can be filled with resin 23 having a low moisture permeability, or the surface of the optical waveguide module can be coated with the resin having a low moisture permeability.

As described above, by providing the half cases of the upper-lower separation type case, each symmetrically having protrusion(s) and recess(es) for fitting and the identical structure with optical-fiber lead-in grooves and fiber fixing grooves, it becomes possible to assemble the package of an optical waveguide module with only one type of half case.

Effect of the Invention

According to the present invention, by using two half cases with identical structure, each half case having protrusion(s) and recess(s) for fitting, the number of parts types can be reduced, as compared with the conventional cases.

In addition, by providing optical fiber lead-in grooves and optical-fiber fixing grooves in the half case, the number of parts can be reduced.

Therefore, the present invention provides the parts that can be assembled easily, while reducing the number of working processes.

What we claim is:

1. An optical waveguide module-mounted package containing an optical waveguide module in a separation type case, said module comprising an optical waveguide chip and a pair of optical fibers connected to said optical waveguide chip in the manner that the optical axes of said chip and said fibers are aligned with each other, wherein said separation type case is formed by combining two identical half cases, wherein said separation type case has an optical-fiber lead-in groove at each end for leading said optical fibers into the case, and one or more optical-fiber fixing grooves located inwardly of said lead-in groove for fixing said optical fibers by resin, said optical-fiber fixing groove is deeper than said optical-fiber lead-in groove.

2. The optical waveguide module-mounted package according to claim 1, wherein the middle portion of said separation type case has a recess for receiving said optical waveguide chip, said recess being deeper than said optical-fiber fixing groove.

3. The optical waveguide module-mounted package according to claim 1, wherein the mating surfaces of the two half cases forming said separation type case are adhered to each other with a sealant.

4. The optical waveguide module-mounted package according to claim 1, wherein the space inside said separation type case is filled with resin.

5. The optical waveguide module-mounted package according to claim 1 wherein said separation type case is formed by combining two identical half cases, each half case being provided with a mating surface having one or more recess-protrusion pairs for fitting, said recess and said protrusion of one half case is fitted over the protrusion and in the recess respectively of the other half case.

* * * * *